Oct. 1, 1968  R. J. DRAGO  3,403,781
METHOD AND APPARATUS FOR CLEANING AND
GRADING DRY BEANS
Filed Sept. 22, 1965  3 Sheets-Sheet 1

INVENTOR.
Robert J. Drago
BY
Popp and Sommer
Attorneys

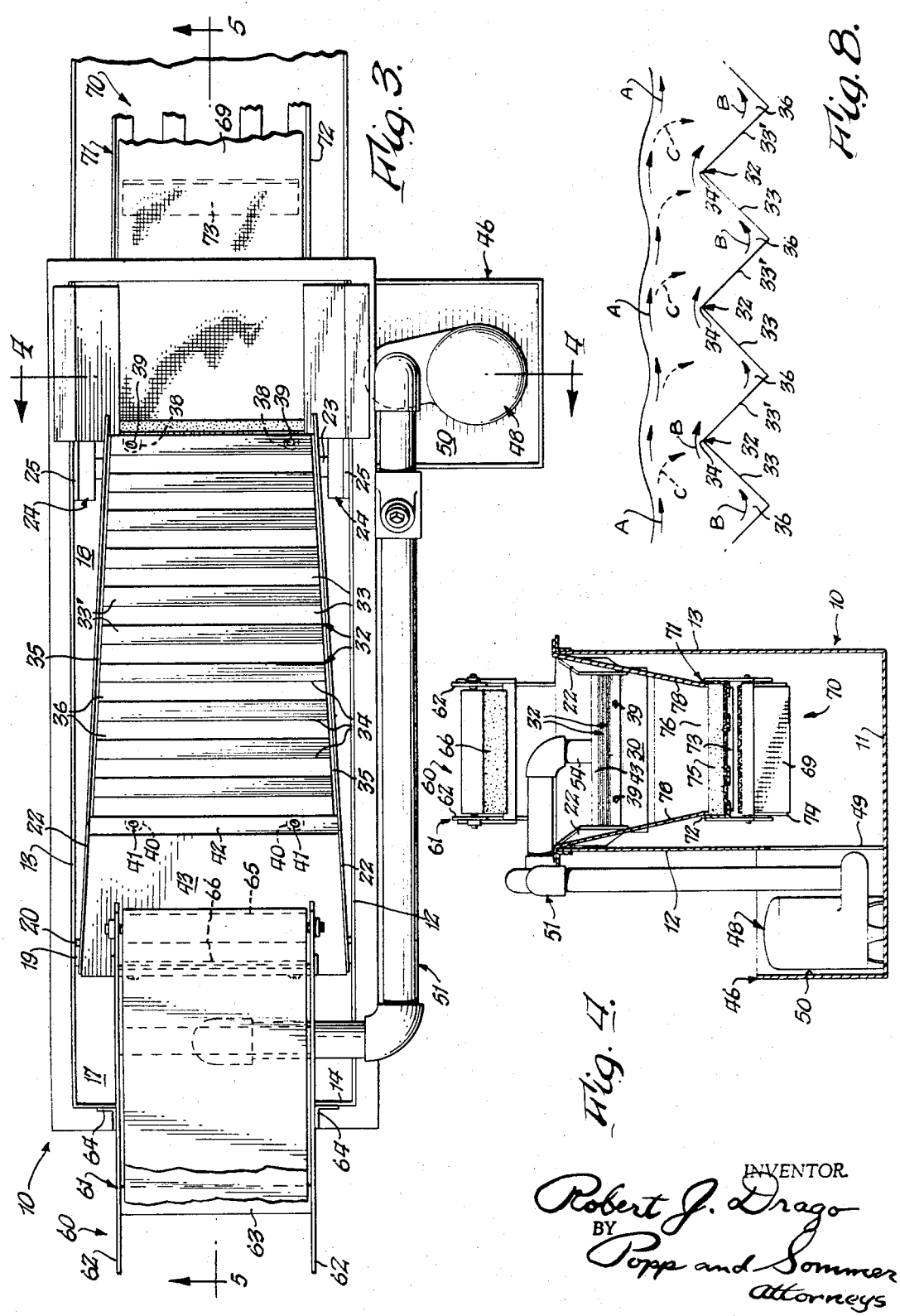

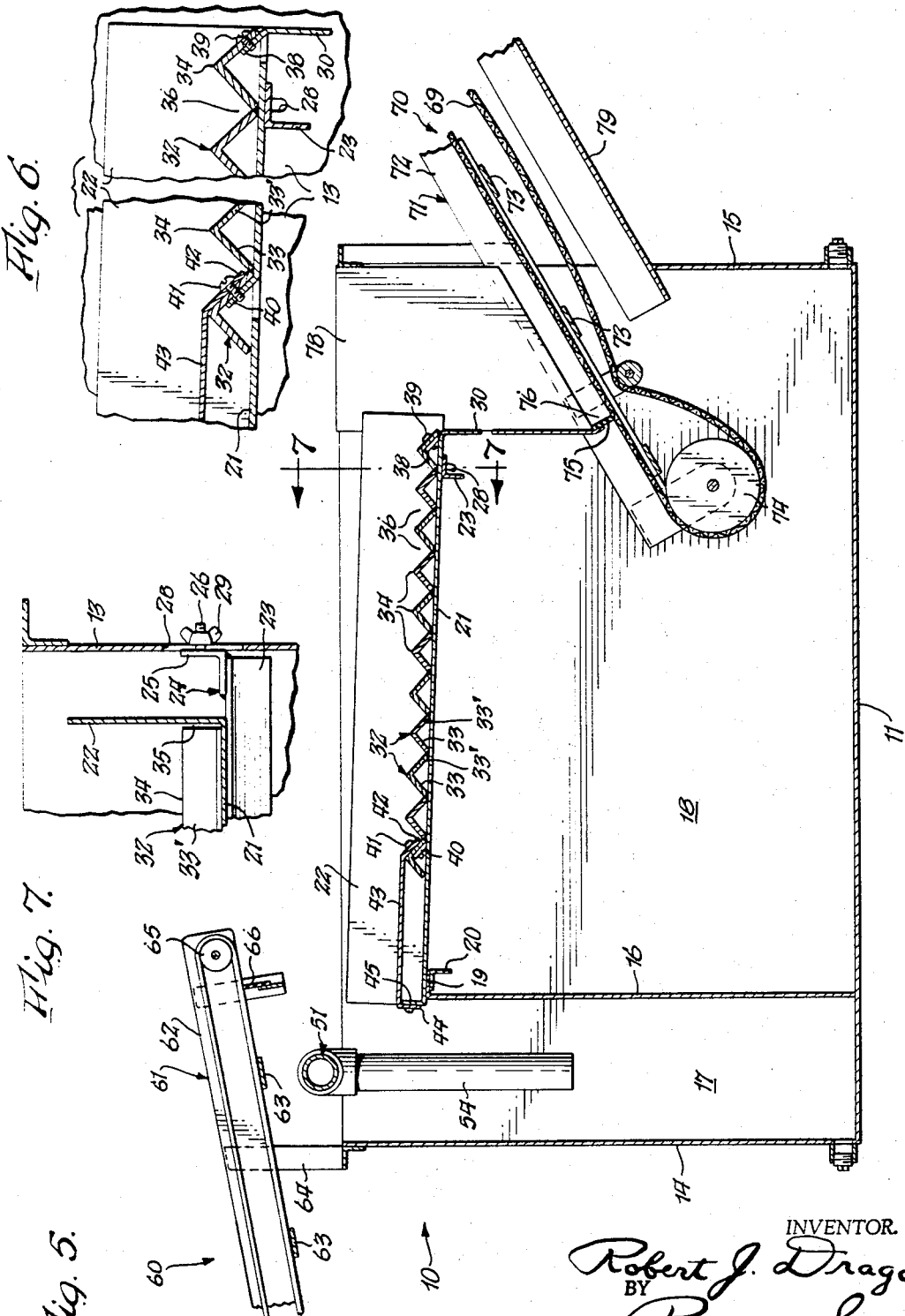

United States Patent Office 3,403,781
Patented Oct. 1, 1968

3,403,781
METHOD AND APPARATUS FOR CLEANING AND
GRADING DRY BEANS
Robert J. Drago, 3104 Lake Heights Drive,
Hamburg, N.Y. 14075
Filed Sept. 22, 1965, Ser. No. 489,327
3 Claims. (Cl. 209—10)

ABSTRACT OF THE DISCLOSURE

A machine for water washing and grading vegetables, such as dry soaked beans heavier than water and including a flume inclined downstream and having contiguous transverse inverted V-shaped ribs forming contiguous V-shaped transverse channels, an overflow tank and a flat plate connected to the highest rib for overflowing water over the plate in a substantially eddyless stream into the flume, a conveyor for dropping the vegetables into the stream flowing down the plate, whereupon the stream is converted in the flume to an undulating flow across the ribs to produce velocity and pressure differentials sucking the dense vegetables and heavier solid foreign matter successively into the channels in accordance with Bernoulli's Principle, but permitting the less dense vegetables to flow over the ribs, a screen conveyor for receiving the stream and separating less dense vegetables discharged from the flume, and a water collecting tank, a pump and a pipe connected to the overflow tank for recirculating the water and helping to produce the eddyless stream.

This invention relates to a method and apparatus for cleaning and quality grading vegetables which are substantially heavier than water, and more particularly to such a cleaner and quality grader and method using sweet or fresh water not only to remove heavier foreign matter from soaked dry beans and the like, but also remove such soaked dry beans which have not accepted a required amount of water during soaking; which are of inferior quality for canning purposes; and which are substantially denser or have a substantially higher specific gravity than those dry beans which have accepted the required amount of water during soaking.

The dry beans which the canner buys from the broker have, of course, a reduced water content as compared with their original ripe condition on the plant and have dried so as to have different degrees of moisture content, a moisture content in dry beans of from 16 to 18% by weight of moisture being the most deisrable so far as the canner is concerned. All such soaked dry beans are heavier than water, but those poorer quality beans for canning which refuse to accept an adequate amount of water during the soaking process, usually called "soakers," are denser and have a much higher specific gravity than those which have soaked up water properly. All such dry beans as purchased from the broker also contain heavier foreign matter of small size, particularly heavy particles such as small stones and bits of glass and metal which are smaller than the beans and hence have not been screened out.

The subject vegetables are intended for human consumption in canned form and it is imperative that all heavier foreign matter, such as bits of glass, stone or metal, be removed in their entirety.

It is the principal object of the present invention to remove completely, by recirculated sweet or fresh water, from heavier-than-water vegetables, foreign materials which are both heavier than water and heavier than the vegetables.

Another object is to provide such a machine which is so highly selective as to separate different qualities of such vegetables from each other, such as separating relatively buoyant soaked dry beans, which have absorbed a required amount of water, from soaked dry beans which have refused to accept the required amount of water and have a high specific gravity.

Another object is to provide a washing machine which will completely remove very fine particles of stone, metal, glass and the like from the vegetables, the machine removing particles of a size less than 0.020 inch. This is achieved by passing a stream of sweet water carrying the vegetables and foreign matter transversely over a series of channels with a minimum turbulence and with the channels so shaped as to cause the stream to flow different distances at different velocities or speeds and thereby produce a pressure differential and downward suction acting to lodge the fine particles heavier than the vegetables and the water in the bottoms of the channels, because according to Bernoulli's Principle, Theorem or Effect, the velocity of flow is inversely proportional to the pressure.

Another object is to provide such a washing machine in which the transverse channels fill up with such heavier foreign matter, together with any denser low quality vegetables, progressively so that by direct simple observation it can be seen when the machine has reached its capacity and should have the heavier foreign material and any low quality vegetables removed therefrom.

Another object is to provide such a washing machine in which there is uniform distribution of the foreign material and any denser low quality vegetables successively the full length of the transverse channels, this also being achieved by the application of Bernoulli's Principle, Theorem or Effect, because of the reduced lateral pressure along the bottom of the channels.

Another aim is to provide such a quality grader and washing machine which can be readily cleaned, the section providing the transverse channels being capable of being readily removed, emptied of foreign matter and replaced.

Another object is to use recirculated sweet water and to reduce turbulence in the operating zone to a minimum, this being achieved by delivering the return water to a large body in such manner as to minimize turbulence in the top of the body; overflowing this body over the horizontal top edge of a plate at the top of a flume, as a broad, shallow stream from which eddies are further eliminated on passing over the plate; and thereafter passing this broad shallow stream over a series of transverse, V-shaped channels in the flume with a minimum of turbulence in passing from channel to channel, the V-shaped channels being separated from one another only by sharp peaks along the channels so that the shallow stream passes in a regular sinusoidal undulating stream over said channels and peaks with the bottom portion of the stream in each channel traveling a greater distance than the top portion thereof so as to provide a downward suction as the shallow stream passes transversely through each channel.

Another object is to provide such a machine which is easy to keep in a clean and sanitary condition; is low in initial and upkeep cost; and is highly efficient and reliable in operation and is not likely to get out of order or require repairs.

Other objects and advantages of the invention will be apparent from the following description and drawings in which:

FIG. 3 is a top plan view thereof and showing a fragmentary top elevational view of the infeed and the discharge conveyers.

FIG. 4 is a vertical transverse section taken generally on line 4—4, FIG. 3.

FIG. 5 is a vertical longitudinal central section taken generally on line 5—5, FIG. 3.

FIG. 6 is an enlarged view similar to FIG. 5 and showing certain details of construction.

FIG. 7 is an enlarged fragmentary vertical section taken generally on line 7—7, FIG. 5.

Figure 1:
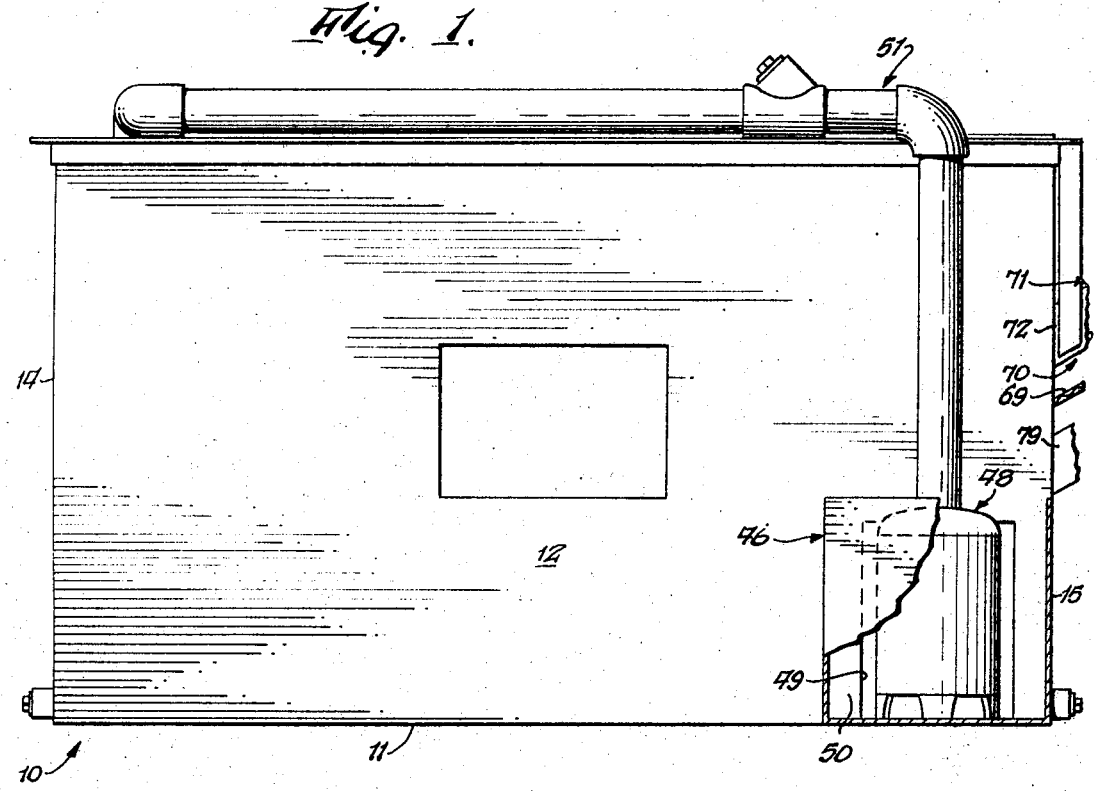
FIG. 1 is a side elevational view, with parts broken away, of a cleaner and quality grader for soaked dry beans and the like embodying the present invention.
Figure 2:
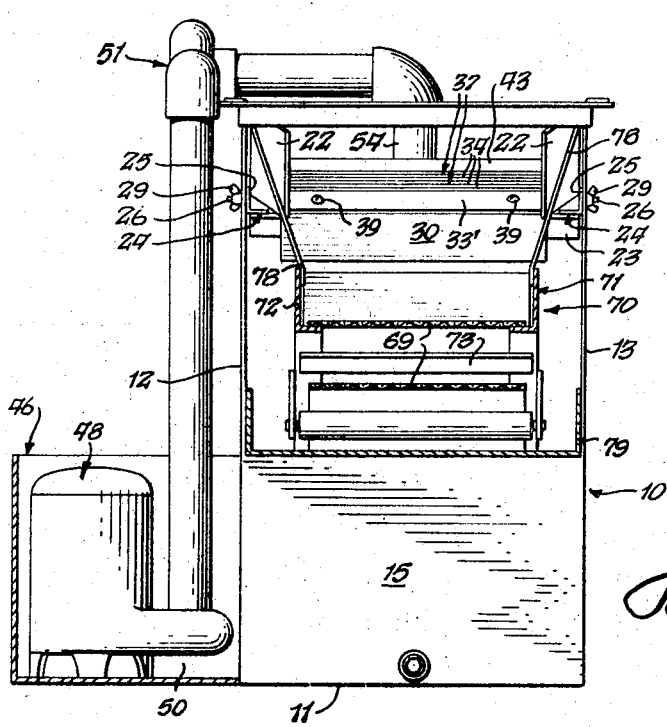
FIG. 2 is an elevational view thereof, this section being taken from the right hand side of FIG. 1, and also being a sectional view through the conveyer which discharges the cleaned product from the cleaner and quality grader.

FIG. 8 is a diagrammatic representation of the flow of the shallow stream of sweet or fresh water over the successive transverse ribs and channels in a flume and illustrating the manner in which a pressure differential producing a downward suction is created in the shallow sinusoidal water stream, to draw all particles which are heavier than the dried beans or the like to the bottoms of the channels.

The cleaner and quality grader of the present invention is shown as contained within a rectangular housing indicated generally at 10 and which forms the standard for the operating parts of the cleaner and quality grader. This casing is in the form of a sheet metal tank having a bottom wall 11, side walls 12 and 13 and end walls 14 and 15, the latter end wall being at the discharge end of the cleaner and quality grader and rising a relatively short distance from the bottom wall 11 as compared with the other walls of the tank.

Adjacent the opposite end wall 14 at the infeed end of the cleaner and quality grader, the tank is provided with an internal transverse partition 16 which forms a deep water overflow chamber or tank 17 extending the full width of the tank and extending close to the top thereof. The space within the tank 10 on the opposite side of the partition 16 is designated at 18. The upper end of this partition 16 is formed to provide a flange 19 projecting horizontally toward the end wall 15 at the discharge end of the cleaner and quality grader and supported by a cross angle supporting frame bar 20 the ends of which frame bar are suitable supported on the side walls 12, 13.

The parts 19, 20 removably support the upper horizontal edge of a sheet metal plate 21 which inclines downwardly, with reference to the horizontal, toward the discharge end of the cleaner and quality grader at an included angle of about 1°–5°. The sides of this plate are bent upwardly to form vertical side walls 22 so as to provide a broad shallow trough or flume. Preferably these side walls 22 converge toward each other toward the discharge end of the cleaner and quality grader as best shown in FIG. 3, so as to insure the discharge of the sweet water and good quality soaked dry beans onto an inclined discharge conveyer, as hereinafter described.

The lower end of the flume plate 21 is supported on a frame cross angle bar 23 the ends of which can be adjustably mounted on the side walls 12, 13 of the tank as illustrated in detail in FIG. 7. Thus each end of this frame cross bar 23 can have welded thereto a bracket 24 providing an upstanding ear 25 which is arranged in face-to-face relation with its companion side wall 12 or 13 and is provided with a stud bolt 26 projecting horizontally outwardly through an upright slot 28 provided in this wall. Each stud bolt is shown as provided with a wing nut 29 and it will be seen that upon loosening the wing nuts 29 the lower end of the trough-like plate or flume 21 can be rasied or lowered to provide the desired angularity of the same with reference to the horizontal, following which it can be fixed in any selected inclination by tightening the wing nuts 29. The lower end of the flume plate 21 is also continued vertically downwardly, as indicated at 30, to provide a vertical apron directed toward the discharge conveyer, as hereinafter described.

An important feature of the invention comprises the provision of a particular form of transversely ribbed surface on the upwardly facing bottom of the flume plate 21 between its side walls 22. This surface is shown as provided by a plurality of angle irons 32 the upstream and downstream side flanges 33, 33' of which are of equal width and arranged at a 90° included angle with reference to each other. It is important that the apex edge 34 of each of these angle irons be at a sharp angle. The ends of these angle irons are arranged in closely spaced relation to the side walls 22 of the flume plate 21. This space, designated at 35 in FIGS. 7 and 3, is less than one sixteenth of an inch, so as to permit a small flow of water around the opposite ends of the ribs but to prevent the passage of beans or any substantial amount of trapped material. large or small, around the ends of these ribs. These angle irons or ribs are arranged with the outboard longitudinal edges of their flanges 33, 33' in edge-to-edge abutting or contiguous relation to one another so as to form a succession of transverse V-shaped troughs 36 the bottoms of which are formed by the sharp 90° angle produced by the abutting edges of the angle irons and the tops of which are provided by the sharp peaks 34. These angle irons can be secured in the trough or flume 21 in any suitable manner, as by being welded to one another and then removably placed in the trough 21 and secured therein in any suitable manner. As shown, the lower end of the cross channel structure so produced by the welded transverse angle irons 32 is secured to ears 38 struck upwardly from the lower end of the plate 21 by means of bolts 39. Similarly ears 40 are struck upwardly from the upper end of the flume plate 21 and are secured to the corresponding flange of the uppermost cross angle bar 32 by bolts 41. These bolts also secure the depending flange 42 of a shelf or eddy diminishing plate 43 which is arranged in vertically spaced relation above the upper end of the flume plate 21 to provide the bottom for the upper inlet or upstream end of the flume and is provided with a depending flange 44 which engages and is secured to an upright flange 45 rising from the upper transverse edge of the flume plate 21.

A substantially eddyless stream of water flows down the transversely ribbed bottom surface provided in the flume plate 21 by the cross angle bars 32. To this end a pump box 46 is fixed to the side wall 12 of the tank and contains a centrifugal pump 48 having an inlet in its bottom. The space 50 within the pump box is in communication with the space 18 in the tank 10 via an opening 49 so that water is withdrawn from this space 18 by the pump 48 and delivered to its discharge line 51. This discharge line terminates in a downwardly directed length of pipe 54 arranged within the deep overflow chamber or tank 17, preferably at the center thereof and below the upstream end of flume 21, the greater portion of the depth of this tank lying below the flume. The water so discharged downwardly rises and overflows the upper horizontal edge of the shelf or eddy eliminating plate 43, flowing down this plate as a shallow stream. By reason of this reversal in flow of the water downwardly into and then up to the shelf plate 43, eddies in the water are substantially reduced, and such eddies are substantially eliminated in overflowing the shelf-like plate 43 and flowing as a shallow stream down the flat surface thereof. It has been found unnecessary to provide fins or other eddy eliminators on the upper surface of the shelf plate 43 to eliminate objectionable eddies.

As previously indicated, the present invention is both a cleaner and also, in conjunction with such vegetables as soaked dry beans and the like, a quality grader using sweet or fresh water not only to remove heavier foreign matter from soaked dry beans and the like but also to remove dry beans which are unacceptable for canning due to the fact that in the soaking process they have not accepted a required amount of water, such soaked dry beans being substantially heavier than those dry beans which have accepted the required amount of water during the soaking.

As a cleaner, the machine is particularly applicable to remove small particles of stone, glass and metal, that is, particles of less than 0.020 size, from the soaked dry beans. Also removed are small irregularly shaped pieces which may have the same specific gravity as the dry beans, such as small fragments of the soaked dry beans themselves, soaked dry beans being themselves heavier than the sweet, fresh or substantially unsalted water recirculated to provide the cleaning and quality grading medium.

The shallow stream of water so flowing over the shelf plate 43 is a stream of sweet or unsalted water, to which makeup water, of course, can be added, such stream being recirculated by the pump 48. This pump 48 daws water from the chamber 18 within the rectangular housing 10 through the opening 49 leading to the pump box 46. The outlet line 51 of this pump terminates in the downwardly directed nozzle 54 within the overflow chamber 17 so as to direct a stream of water downwardly into this overflow chamber. This water rises, counterflow to the inlet discharge, and in so rising eddies are very substantially reduced and are of small value on reaching the top of the overflow chamber 17 where the recirculated water overflows as a shallow stream flowing down the inclined shelf plate 43 which forms the upper end of the flume 21. In flowing down this inclined shelf plate 43 eddies are further eliminated until on reaching the first of the channels 32 the shallow stream is substantially eddyless. This stream flows downwardly, and is connected to an undulating or sinusoidal stream traveling progressively into each cross channel 36 and thence over each apex 34 of the ribs 32 forming these cross channels. The shallow stream on leaving the downstream rib 32 is discharged by gravity through the upper and lower stretches of the discharge conveyor 70 back into the tank chamber 18 for recirculation as previously described.

The cleaner and quality grader illustrated is particularly designed to clean and quality grade soaked dry beans and the like. Such beans are purchased, dry, from a broker. The dry beans as purchased from the broker are heavier than water, having an optimum moisture content, from the canner's point of view, of from 16 to 18% by weight of water. Before canning, it is necessary to rehydrate the beans, desirably to a uniform moisture content. This is done by soaking the beans to have any desired higher, and preferably uniform, moisture content by soaking the dry beans from 12–15 hours in 60–70° F. water. However, some dry beans from the broker, often those which have considerably less than the optimum 16–18% by weight of water, will not hydrate on such soaking. Such beans which refuse to accept adequate water on soaking are dense and have a higher specific gravity than dry beans which have accepted hydration, and are also not only of inferior quality, from the canner's point of view, but also are highly undesirable in admixture, when canned, with the beans which have accepted adequate water on soaking.

The soaked dry beans, which themselves are heavier than water, containing principally beans which have accepted an adequate amount of water but also containing the denser dry beans which have refused to accept such water as well as bits of heavier than soaked dry beans foreign material, such as glass, sand and metal particles, are fed onto this shelf plate 43 of the flume into the shallow stream of water flowing thereover by an infeed conveyer indicated generally at 60. Essentially this infeed conveyer comprises a frame 61 composed of side plates 62 cross connected by bottom frame bars 63 and supported by vertical angle irons 64 projecting upwardly from the end wall 14 of the tank. This frame carries an endless conveyer 60 the upper stretch of which on traversing the roller 65 drops the dry beans onto the shallow stream of water flowing on the shelf plate 43, a suitable doctor blade 66 being in contact with the adjacent part of the bottom stretch of this endless conveyer 60 to insure that all material tending to cling to the belt will drop onto the shallow stream of water flowing over the shelf plate 43.

The soaked beans, together with such heavier foreign matter, so dropped into the substantially eddyless stream of water flowing over the shelf plate 43 are carried into the zone of action of the first transverse channel 36 provided by the uppermost pair of cross angle bars 32. In flowing through this trough the surface part of the stream of water flows directly to the apex 34 of the uppermost fully exposed angle cross bar 32, as indicated by the top arrows A in FIG. 8, whereas the water flowing downwardly into the bottom of this cross channel traverse a longer path as indicated by the curved arrows B in FIG. 8. The flow of water across this top cross channel 36 is however at a different speed or velocity, depending upon whether it follows the course of the arrows A or B and such speed differential creates a downward suction which tends to draw the materials carried by the stream into the bottom of the uppermost cross channel. This downward suction is due to the fact that any fluid, whether liquid or gaseous, when moving across a surface, will exert on that surface a pressure inversely proportional to the velocity of the moving fluid according to Bernoulli's Principle, Theorem or Effect. Since in the present case the velocity of the substream (arrows B) is greater than the velocity of the surface stream (arrows A), this speed differential creates a downward suction particularly effective against heavier objects of smaller size being carried along by the surface stream. In the case of such objects which are heavier than the soaked beans, even if very small, this downward suction effect is completely effective, particularly on particles of stones, glass and pieces of metal, such particles being drawn into the bottom of the topmost cross channel 36, as indicated by the arrows C, and thence, also according to Bernoulli's Principle, Theorem or Effect, migrating toward the ends of the cross channel by virtue of the pressure differential lengthwise of the bottom of the cross channel caused by the velocity differential transversely of the channel. This downward suction is also effective against the denser undesirable beans which have failed to accept an adequate quantity of water during soaking. Such denser undesirable beans are also sucked to the bottom of the topmost cross channel 36 in the same manner as with metal, glass and stone particles. Small fragments of soaked beans of all qualities are also sucked down into the topmost cross channel.

However, this downward suction in the topmost channel 36 is not effective against dry beans which have accepted an adequate amount of water both because the dry beans which on soaking have accepted an adequate amount of water, while heavier than water, are not so heavy as stones, glass and metal and are more buoyant than the beans which refused to accept an adequate amount of water on soaking, and also because of the large bulk and rounding form of the properly soaked dry beans. While the more buoyant soaked dry beans which have accepted the required water on soaking, both whole and as splits, tend to be drawn to the bottom of the topmost cross channel 36, before they can be drawn down an appreciable distance they come into the zone of action of the upward movement of the subsurface water rising to flow over the sharp peak 34 forming the downstream side of the topmost channel 36, indicated by the rising heads of the arrows B, and are carried up over this sharp apex or peak 34 of the first fully exposed cross angle bar 32.

It has been found that this topmost cross-channel 36 fills substantially completely with small pebbles, minute pieces of metal, glass and denser, low quality beans which have failed to accept the required water on soaking before the next succeeding cross channel 36 comes into action. Thus, when the topmost cross channel 36 is so substantially completely filled with dense, low quality dry beans which have refused adequate water on soaking, as well as heavier than soaked dry beans foreign matter, the next succeeding lower cross channel 36 comes into action in the same manner as previously described, the dense low quality soaked dry beans and the heavier than soaked dry beans foreign objects being sucked down into this now operative cross channel 36 by the differential between the velocity of the water in following the arrows A and B, and the rounding properly hydrated beans coming into the zone of action of the rising subsurface water as designated by the heads of the rising arrows B, before they can settle into the bottom of the cross channel.

Accordingly in flowing down transversely through the cross channels 36 provided by the connected angle bars 32, the heavier than soaked dry beans foreign material, as well as those low quality soaked beans which have resisted hydration, are drawn into the bottoms of the cross channels 36 and when all of of these cross channels are completely filled the operation must be stopped and the flume plate 21, 22, together with its attached angle bar structure removed, cleaned and replaced.

The properly hydrated beans flow over the lowermost cross angle bar 32 and downwardly along the vertical apron 30 onto the conveyer 70 comprising a foraminous endless belt 69 the top stretch of which conveyer belt 69 has its receiving end arranged within the chamber 18 of the tank 10 and travels at an upward inclination sufficient to carry the clean properly hydrated beans out over the low end wall 15. For this purpose this endless conveyer 70 is carried by a frame 71 composed of side plates 72 cross connected by bottom cross pieces 73 and carrying a roller 74 around which the endless conveyer belt 69 passes.

A rubber strip 75 is secured along the bottom of the apron 30 to not only wipe the upper stretch of the conveyer 70 but also to form a pocket 76 in which beans can gather. The beans discharged from the lower outlet of the trough-like plate or flume 21, 22 are guided into this pocket 76 by side guide plates 78 the upper edges of which can be suitably connected to the tops of the side walls 12, 13 and the lower edges of which are arranged against the inside faces of the side bars 72 of the outlet conveyer frame 71. An inclined chute 79 is preferably provided to receive any clinging water falling from the beans being conveyed upwardly by the upper stretch of the endless conveyer 70 so that such water flows back into the tank chamber 18.

In the operation of the cleaner and quality grader for soaked dry beans, the inclination of the flume plate 21, and hence the structure providing the cross channels 36 on its bottom, are at an included angle to the horizontal of from 1° to 5°, preferably 2°. The sweet water is recirculated at such rate that the overall velocity of the water and vegetables flowing over the ribs 32 is in the order of 2.5 feet per second. The water is also supplied so that the depth of the water flowing over the apices 34 of these ribs 32 is in the order of 1⅞ inches. The water is supplied so that the gallons per minute per inch across the shelf plate 43 is in the order of 13.75 gallons. With these conditions, with soaked dry beans, the objectives and advantages of the invention are achieved.

I claim:

1. A machine for water washing and quality grading vegetables, such as soaked dry beans which are substantially heavier than water, which comprises a frame, a relatively broad and shallow flume supported on said frame at a slight inclination downstream to the horizontal and having side walls and a bottom including contiguous and upwardly projecting, inverted V-shaped ribs extending transversely of the flume between said side walls, said ribs having sharp peaks formed by angularly disposed upstream and downstream walls with the upstream wall of each rib being arranged in substantially edge abutting relationship with, and forming a continuation, at a sharp included angle, of the downstream wall of the next upstream rib whereby said ribs form a series of contiguous and upwardly open, V-shaped transverse channels separated from one another only by said sharp peaks whereby water flowing down said flume in a regular sinusoidal undulating stream over said channels and peaks travels at a higher velocity in traversing the bottom of said channels than the surface speed of the water to exert a downward suction on the vegetables and solid foreign matter which sucks abnormally dense, low quality vegetables and such solid foreign matter heavier than the beans to the channel bottom but permits the less dense vegetables to flow over said sharp peaks, means for introducing a broad, shallow, substantially eddyless stream of water into the uppermost of said channels at the upstream end of said flume to flow down said flume successively transversely through the succeeding lower channels and over said peaks, and including flat surface means arranged between said side walls and forming the upstream end of said flume with its downstream edge connecting with the highest rib and over its opposite upstream edge said stream of water is caused to overflow, feeding means for dropping the vegetables into the shallow, broad stream of water flowing down said flat surface means, and screen means receiving the stream discharged from said flume and separating the washed less dense vegetables from the water.

2. A machine as set forth in claim 1 additionally including means collecting the water after passing through said screen means and a recirculating pump receiving such collected water and wherein said means for introducing a broad, shallow, substantially eddyless stream of water to the upstream end of said flume also includes a deep tank having the greater portion of its depth below said flume and its downstream upper edge formed by said upstream edge of said flat surface means, and a discharge pipe from said recirculating pump directed downwardly into said tank below said upstream end of said flume, whereby the eddies produced by the downstream discharge from said pipe are reduced as the water rises and overflows said downstream upper edge of said tank.

3. The method of washing and quality grading vegetables, such as soaked dry beans and the like by removing heavier solid foreign matter and low quality denser beans which have refused to accept an adequate amount of water during the soaking period, which method comprises forming a broad, shallow substantially eddyless stream of water overflowing the upstream edge of flat surface means forming the upstream end of a flume inclined downstream and the downstream edge of which surface means connects with the highest rib of a series of contiguous and upwardly projecting ribs extending transversely of said flume and forming a series of contiguous and upwardly open transverse channels, dropping the vegetables into the shallow broad stream of water flowing down said flat surface means, converting said substantially eddyless stream into an undulating stream flowing across said ribs and channels and thereby increasing the velocity of the bottom of said stream traversing said ribs at rapidly repeated intervals in said channels to suck heavier than soaked dry bean solid foreign matter and also such denser beans which have refused to accept an adequate amount of water downwardly into the bottom of said stream at said intervals in said channels, collecting said heavier than soaked dry bean solid foreign matter and denser dry beans at the bottom of said stream in said channels, removing the more buoyant soaked dry beans at the downstream end of said flume, and returning the water, following such removal, to be reformed into said substantially eddyless shallow flowing stream.

References Cited

UNITED STATES PATENTS

| | | | |
|---|---|---|---|
| 618,006 | 1/1899 | Habersham | 209—14 |
| 690,082 | 12/1901 | Snyder | 209—506 X |
| 749,706 | 1/1904 | Storey | 209—437 |
| 1,043,280 | 11/1912 | Wilfley | 209—437 |
| 3,042,198 | 7/1962 | Slavich | 209—458 X |
| 3,143,495 | 8/1964 | Stephan | 209—506 X |

FRANK W. LUTTER, *Primary Examiner.*